Feb. 27, 1962 J. W. N. SHIRES 3,022,904
FULLY AUTOMATIC MACHINE FOR LOADING AND UNLOADING
CRATES, BOXES AND LIKE CONTAINERS IN STACKS
Filed Dec. 3, 1958 4 Sheets-Sheet 2
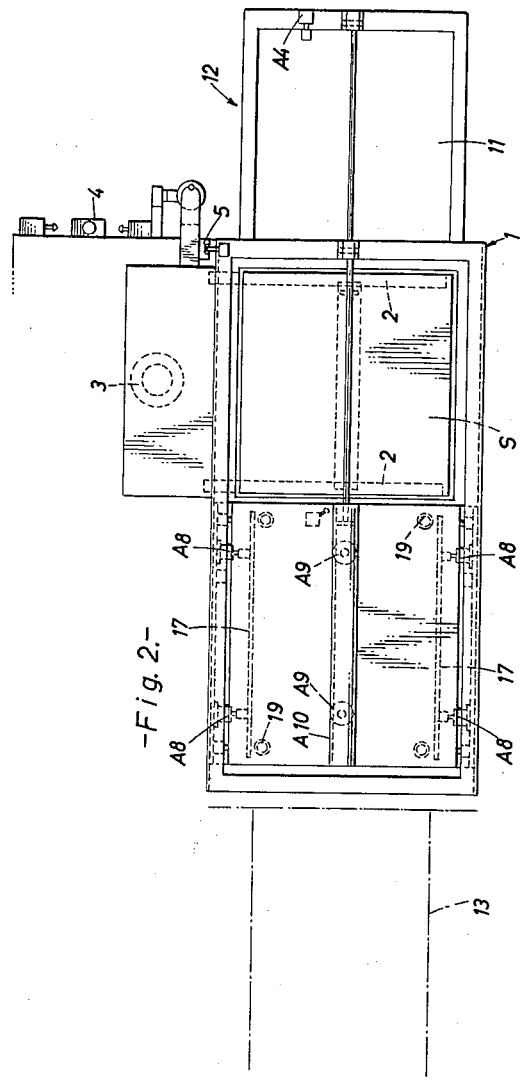
INVENTOR
James W N. Shires
BY
Leon Simon
ATTORNEY Feb. 27, 1962  J. W. N. SHIRES  3,022,904
FULLY AUTOMATIC MACHINE FOR LOADING AND UNLOADING
CRATES, BOXES AND LIKE CONTAINERS IN STACKS
Filed Dec. 3, 1958  4 Sheets-Sheet 3
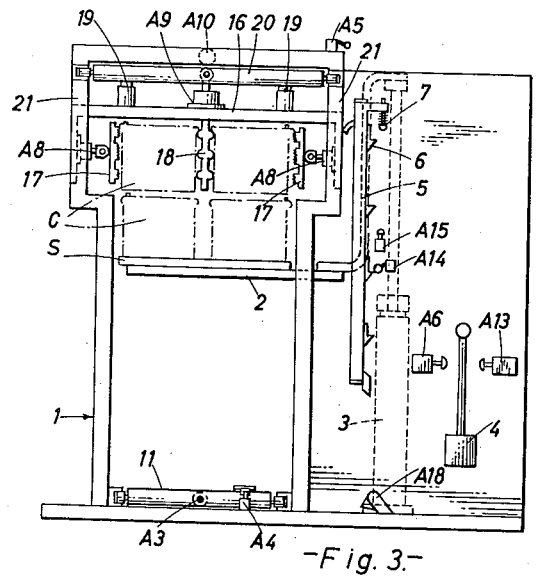
-Fig. 3.-
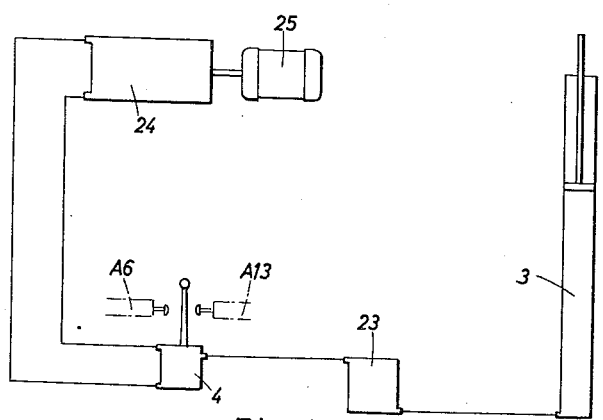
-Fig. 4.-
INVENTOR
James W. N. Shires
BY
Leo Simon
ATTORNEY

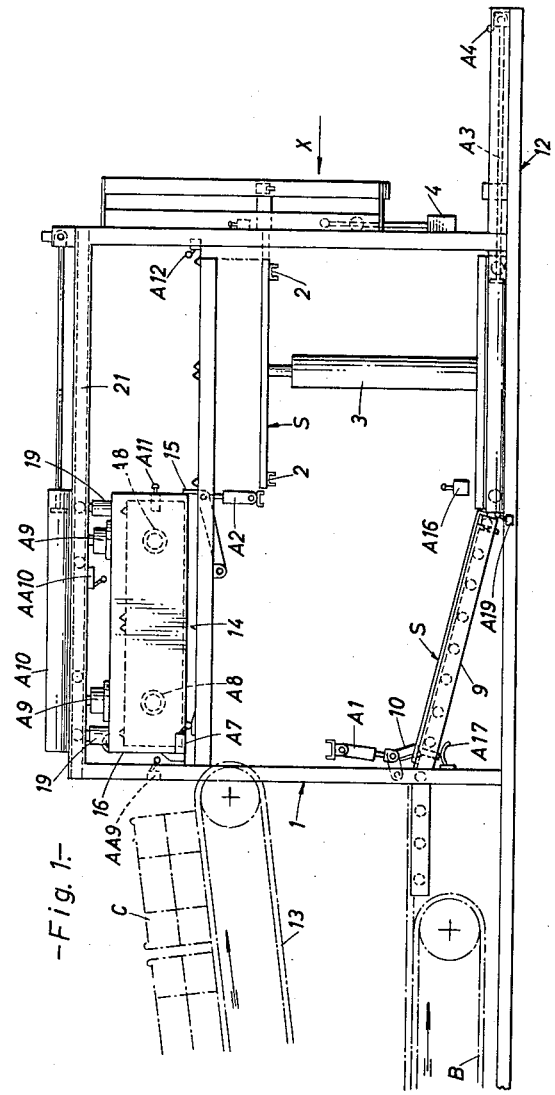

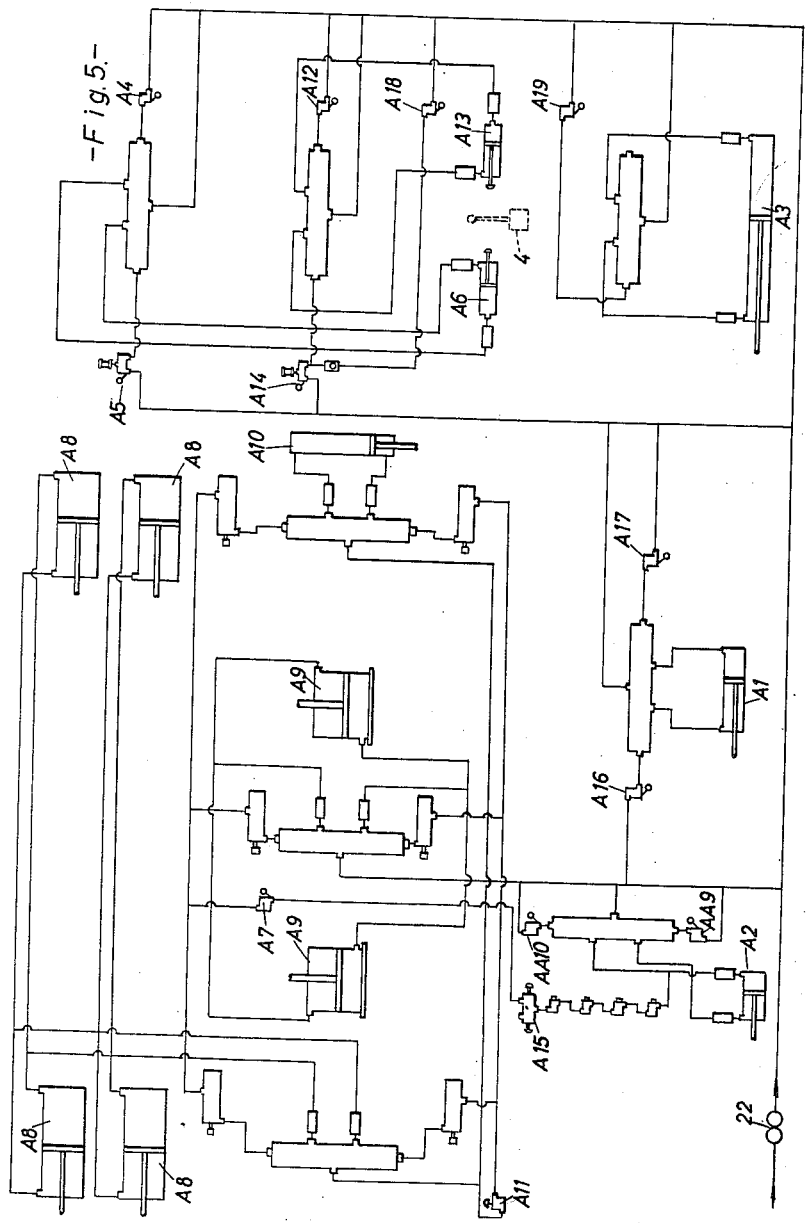

United States Patent Office 3,022,904
Patented Feb. 27, 1962

3,022,904
FULLY AUTOMATIC MACHINE FOR LOADING AND UNLOADING CRATES, BOXES AND LIKE CONTAINERS IN STACKS
James William Nutter Shires, Shelf, near Halifax, England, assignor to Express Dairies (Northern) Limited, Sheffield, England
Filed Dec. 3, 1958, Ser. No. 777,932
Claims priority, application Great Britain Dec. 5, 1957
3 Claims. (Cl. 214—6)

This invention relates to a machine for loading and unloading crates, boxes and other containers and packages in stacks on to or from stillages, pallets and similar or other platforms. Heretofore, the loading of crates and the like in stacks on to stillages and other platforms has usually involved some measure of manual effort or at least manual control to produce and regulate the various movements, although automatic or semi-automatic apparatus for stacking cartons and like flat-bottomed packages on pallets have been proposed.

The chief object of the present invention is to provide a machine by means of which the loading (or unloading) of stillages and the like or other platforms with crates and the like in a plurality of stacks can be done entirely automatically. Another object is to provide a machine capable of performing such automatic stacking or unstacking operations with wire crates or boxes which are used for transporting milk and other bottles and which have interengaging means for ensuring the proper locating of all crates in a stack. A further object is to provide a machine which, considering the work it does, is comparatively simple and not readily liable to breakdown or fault which would cause a stoppage. A still further object is to provide a machine capable of loading or unloading at a high rate so as to be capable of keeping pace with the output of a modern plant such as a bottle washing or filling plant which requires a rapid handling of crates or boxes.

Whilst this invention is primarily intended for dealing with crates or the like in connection with stillages or pallets which can be transported by means (for example) of fork-lift trucks, it can also be used for loading and unloading crates or the like directly on to or from any suitable platform or support, without the use of stillages or pallets where suitable means is available for placing the crates or the like on such platform or support and removing them therefrom.

With the above objects in view a machine according to this invention includes a platform support for the stacked crates or the like, means for raising and lowering said support and for giving it a step-by-step motion during the stacking (or unstacking) operation, conveyor means for conveying a succession of crates or the like to (or from) a transfer station which is as high as the uppermost position of said support, transfer mechanism for gripping a plurality of crates or the like and carrying them at each operation from (or to) said crate conveying means and lowering (or lifting) them from above while so gripped on to (or from) said support or on to (or from) the uppermost crates of a plurality of stacks of crates resting on said support, and means for automatically controlling all the movements in the cycle of operations required for dealing with each set of stacks of crates and the repetition of such cycle.

In a more particular application of the invention the machine includes feed means for feeding a succession of stillages or the like onto a support, means for raising and lowering said stillage support and for giving it a step-by-step motion during the stacking (or unstacking) operation, conveyor means for conveying a succession of crates or the like to (or from) a transfer station which is as high as the uppermost position of said stillage support, transfer mechanism for gripping a plurality of crates or the like and carrying them at each operation from (or to) said crate conveying means and lowering (or lifting) them from above while so gripped on to (or from) the stillage which is resting on the said support or on to (or from) the uppermost crate of a plurality of stacks of crates resting on said support, discharge means for discharging each stillage after loading (or unloading), and means for automatically controlling all the movements in the cycle of operations required for dealing with each stillage and the repetition of such cycle.

The automatic control means preferably includes a series of valves arranged to control the flow of pressure fluid in a fluid operated system and arranged to be actuated directly or indirectly by movement of the parts of the machine and/or of the crates or stillages in predetermined manner. For example, the movement of the stillage support may be produced by hydraulic pressure, whilst the movements of the remaining elements of the machine, apart from the crate and stillage conveyors, may be produced by air pressure.

Means are provided for pre-determining the number of crates or the like to be loaded on to each stillage and for adapting the machine for dealing with crates or the like of different sizes.

In order that the invention may be clearly understood and readily carried into effect the same will now be more fully described with reference to and by the aid of the accompanying diagrammatic drawings, wherein:

FIGURE 1 illustrates in side elevation a machine according to the invention for loading crates (such as milk bottle crates) on to stillages in stacks of four per layer;

FIGURE 2 is a plan of FIGURE 1;

FIGURE 3 is an end elevation of FIGURE 1 looking in the direction of the arrow X.

FIGURE 4 is a circuit diagram representing a hydraulic system and its controls for operating a stillage hoist;

FIGURE 5 is a circuit diagram representing a pneumatic system and its controls for operating all the other parts of the machine except the conveyors or other means by which the crates and stillages are presented to and removed from the machine.

Referring first to FIGURES 1 to 3 of the accompanying drawings, the machine has a frame 1 in which is mounted a stillage hoist comprising a base or stillage support carried on arms 2, 2 which are arranged to be raised and lowered vertically by the ram of a hydraulic cylinder 3, under control of a hoist valve 4. The hoist base is illustrated in position to receive the second set of crates from the transfer mechanism. The hoist carries with it an adjustable trip bar 5 having dogs 6 which can be adjusted to suit the height of crates to be handled and the number of crates required per stack, and also having at its top an adjustable trip stud 7. The trip bar can have two or more sets of dogs on different sides of the bar so that by twisting the bar on its vertical axis the appropriate set of dogs is brought into use to control the step-by-step lowering of the hoist.

At the backs of the machine an endless stillage conveyor 8 feeds empty stillages $s$ one at a time on to an inclined roller conveyor 9 having a stillage stop lever 10 actuated by the ram of cylinder A1. At the front a stillage collecting trolley 11 can be propelled horizontally by the ram of a cylinder A3 from beneath the hoist to a delivery point 12 and vice-versa, and the rear end of the trolley is arranged when in its rearward position to grip the empty stillage on the inclined conveyor 9 and to draw it on to the hoist base as it removed the loaded stillage therefrom to the delivery point.

Also at the back of the machine an elevated endless crate conveyor 13 feeds crates $c$ in two lines side by side to a transfer station at the top of the machine where two pairs of side-by-side crates can be accommodated upon a roller-bottomed platform 14 having a crate stop 15. Above this platform 14 is the transfer mechanism comprising a shuttle 16 having two longitudinal sides which each support two horizontal air cylinders A8 whose rams operate gripper plates 17, to grip crates between them and a central partition 18 on the shuttle. The shuttle is guided for vertical movement by telescopic guides 19 and supported from cross-members 20 by the rams of two vertical air cylinders A9, and the whole shuttle assembly can be reciprocated horizontally along runways 21 in the frame 1 by an air cylinder A10 from the transfer station as shown in FIGURE 1 to a position directly above the stillage hoist. Thus the shuttle assembly can move in a path defined by a rectangle to perform its operations.

A number of control valves, pilot valves and trip devices are suitably located on the machine and associated with a hydraulic system and a pneumatic system as indicated in FIGURES 1 to 3 viewed in conjunction with the circuit diagrams of FIGURES 4 and 5, and these elements will be referred to and designated hereinafter when describing the operation of the machine. In this connection it is desired to point out that the pneumatic system illustrated in FIGURE 5 embodies elements which are of themselves well known and whose construction and operation in control systems is also well known, and they are therefore only illustrated conventionally and will only be referred to in this description as far as is necessary for a proper understanding of the invention. In all cases the air cylinders referred to in this description have double-acting rams and the system is supplied with air at (say) 80 lbs. per square inch from an air service unit 22.

As indicated in FIGURE 4, the hoist cylinder 3 is supplied through a flow control valve 23 and through the hoist valve 4 from a hydraulic pump 24 driven by a motor 25.

The operation of the machine described above is as follows. An empty stillage is held on the inclined conveyor 9 by the stop lever 10 and crates are fed on to the platform 14 at the transfer station until two pairs are held within the shuttle by the crate stop 15 as indicated in the drawings. The empty stillage, on release from its stop 10 by cylinder A1, is transferred to the loading position on the hoist base by trolley 11 operated by cylinder A3 which at the same time removes to the delivery point the loaded stillage previously on the hoist base. The completion of the return stroke of cylinder A3 opens a pilot valve A4 which causes the hoist cylinder 3 to raise the stillage on the hoist to its top position level with the platform 14.

This upward movement of the hoist causes trip stud 7 to release and open valve A15, passing pilot air to valve A7 which will only operate when there are four crates in correct position within the shuttle. This same movement causes pilot valve A5 to operate cylinder A6 to close the hydraulic circuit and hold the hoist stationary.

The opening of pilot valve A7 causes the four cylinders A8 to be operated to grip the crates and the two cylinders A9 to be operated to lift the whole shuttle assembly. This movement actuates pilot valve AA9 to cause cylinder A2 to partially depress the crate stop 15 and to cause cylinder A10 to operate to transfer the shuttle assembly to the stacking position above the hoist. On reaching this position the shuttle opens pilot valve AA10 which causes cylinder A2 to return the crate stop 15 to its fully raised stop position.

The completion of this shuttle movement operates pilot valve A11 which reverses the action of cylinders A9, A8 and A10 in that order so that the shuttle assembly is lowered, the crates released by the gripper plates 17 to rest accurately located upon the hoist base, and the shuttle returned to the transfer station. The withdrawal of the shuttle causes pilot valve A12 to operate cylinder A13 so as to release the hoist and allow it to descend until pilot valve A14 is actuated by the first dog 6 on the trip bar 5 so as to operate again cylinder A13 which stops the hoist in a predetermined position below the previous one after a movement equal to the height of the crates being handled.

This sequence of crate-transferring and hoist-lowering operations is repeated as many times as needed to stack the desired number of crates in each stack (say 6) under control of the trip bar being used, each successive group of crates being lowered by the shuttle accurately into correct interengaging position upon the previous group. As the hoist reaches its bottom position pilot valve A15 is actuated to cut-off the air supply from all the shuttle cylinders and so immobilise the shuttle mechanism. At the same time the hoist actuates pilot valve A16 to cause cylinder A1 to release the stillage stop lever 10 and also actuates pilot valve A18 which causes cylinder A3 to move the trolley 11 beneath the hoist base to pick up the loaded stillage and the next empty one.

Completion of the trolley's rearward movement opens pilot valve A19 which causes cylinder A3 to operate in the reverse direction whereby the trolley withdraws the loaded stillage to the delivery point and at the same time draws the empty stillage on to the hoist base. This allows a further empty stillage to gravitate down the conveyor 9 and actuate pilot valve A17 which causes cylinder A1 to close the stillage stop 10. Actuation of pilot valve A4 by the withdrawal of the trolley 11 starts a repeat cycle of operations.

By means of the above described machine the loading of stillages can take place continuously and entirely automatically provided the supply of stillages and crates is maintained, and as each operation controls the succeeding one or ones the sequence of operations is maintained and the correct number of crates per stillage is ensured. It is to be understood that any desired delay or time-lag devices may be incorporated in the machine, the use of these with the hydraulic or pneumatic system of this invention requiring no explanation as they are well known in the art of automatic control systems.

The loaded stillages can be removed directly from the delivery point by a fork-lift truck or other suitable means or can be moved along a conveyor to either side or forwardly as desired for subsequent removal.

The machine may be arranged to unload stillages automatically by causing the cycle of operations above described to be reversed, the crates being lifted from the stillage on the hoist and transferred on to elevated crate conveyors which carry the crates away. Also, the crates, boxes or the like containers can be dealt with by the machine of this invention whether they contain bottles or other articles or not.

The adjustable trip bar 5 enables the machine to be adapted from time to time for dealing with crates or the like of different heights, and certain of the pilot valves or their trip devices can be adjusted or changed to enable crates or the like of different plan dimensions to be handled from time to time It will be noted that the step-by-step movement of the hoist is halted by means actuated by the hoist itself, not by the crates or the like thereon, so that the halting of the hoist can be accurately controlled.

In the embodiment of the invention in which the crates or the like are arranged to be loaded on to (or unloaded from) the hoist platform without the use of stillages or pallets, the means hereinbefore described for feeding the stillages on to the hoist platform and for discharging them from it would be omitted, and the necessary modifications would be made to the control and actuating mechanisms to provide the automatic operation of the machine, such modifications lying within the scope of those persons skilled in the art of automatic control systems.

I claim:
1. A machine for loading and unloading crates in a plurality of layers comprising upwardly inclined conveyor means to convey a succession of crates in layers to a platform support at the upper end of said means, a platform support to receive said succession of conveyed crates, a hoist including a hoist base adjacent the end of said platform support for receiving crates in layers conveyed from said platform, a transfer mechanism above said platform support and said hoist for picking up and gripping a plurality of crates and for carrying said crates into layered arrangement from said platform support to said base and for putting down said crates, said transfer mechanism including means for picking up, transferring and putting down said crates with accurate control in conjunction with step-by-step movement of said hoist, means for causing said hoist base to be given a step-by-step movement to allow successive sets of crates to be stacked thereon and unstacked, this step-by-step movement being controlled automatically by preset means which is arranged to be actuated by a member movable with said base but independent of any crates thereon and which can be adjusted from time to time to suit crates of varying heights, stop means for automatically preventing said transfer mechanism from gripping and transferring crates until a full complement of crates is positioned therein, means for raising and lowering said hoist with step-by-step motion, discharge means for discharging said crates in stacks, means for causing said transfer mechanism to move in a path defined by a rectangle during which it grips a full complement of crates from said platform support, lifts them off their support, transports them, lowers them on to said hoist base, releases them and returns to its initial position, and means for automatically controlling the movements in the cycle of operations required for stacking said crates, for unloading said crates and for the repetition of the cycle of stacking and unloading, said automatically controlling means being actuated directly by the movement of said hoist base and the movements of the remaining elements of the machine, apart from the crate and platform conveyors being interrelated for accurate control.

2. A machine as defined in claim 1 wherein said transfer mechanism comprises a shuttle assembly having a central partition extending parallel to the path of the transfer mechanism, laterally and horizontally movable pairs of opposed gripper elements and means for causing said gripper elements to grip crates between them and said partition, means for raising and lowering said shuttle assembly, means for traversing said assembly in the horizontal part of its path, and means for automatically co-relating said first and second means with one another.

3. A machine as defined in claim 1 wherein said automatically controlling means comprises a hydraulic fluid operated system including a series of valves to control the flow of pressure, means actuated by the movement of said hoist base, said means for moving said hoist in step-by-step motion including a second hydraulic fluid operated circuit and means interrelating said first system with said second system for step-by-step loading, transferring and unloading.

References Cited in the file of this patent

UNITED STATES PATENTS

| | | |
|---|---|---|
| 2,508,861 | Jessen | May 23, 1950 |
| 2,523,025 | Jeppson et al. | Sept. 19, 1950 |
| 2,710,696 | Fontaine | June 14, 1955 |
| 2,754,555 | Young | July 17, 1956 |
| 2,796,179 | Van Vleck | June 18, 1957 |
| 2,844,263 | Dreyer | July 22, 1958 |
| 2,875,907 | Locke et al. | Mar. 3, 1959 |
| 2,944,702 | Fenton | July 12, 1960 |
| 2,947,405 | Fenton | Aug. 2, 1960 |
| 2,980,265 | Johnson | Apr. 18, 1961 |